Patented Feb. 18, 1930

1,747,532

UNITED STATES PATENT OFFICE

WERNER SCHULEMANN, FRITZ SCHÖNHÖFER, AND FRITZ MIETZSCH, OF ELBERFELD, GERMANY, ASSIGNORS TO WINTHROP CHEMICAL COMPANY, INC., OF NEW YORK, N. Y.

NEW 6-ALKOXY-8-AMINO QUINOLINES

No Drawing. Original application filed January 30, 1926, Serial No. 85,030, and in Germany April 29, 1925. Divided and this application filed May 16, 1928. Serial No. 278,331.

The present invention concerns the hitherto unknown 6-alkolxy-8-amino-quinolines and in particular the 6-methoxy-8-amio-quinoline, which substances exhibit antipyretic properties similar to those of the 5-amino-8-ethoxy-quinoline, and also exert a strong specific destroying action on blood parasites.

This is a division of our application Serial No. 85,030, filed on January 30, 1926.

These compounds are obtained by the reduction of 6-alkoxy-8-nitro-quinolines or from 6-alkoxy-8-azoaryl-quinolines according to the methods ordinarily used for the reduction of these compounds.

The 6-alkoxy-8-amino-quinolines are intended to find application as curative products and to serve as intermediates for the manufacture of derivatives which are of value in pharmacy.

The following example will serve to illustrate our invention.

Example:

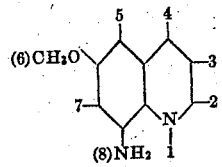

5 kilos of 6-methoxy-8-nitro-quinoline are dissolved in 20 litres of pure concentrated hydrochloric acid of about 35% strength, the solution is heated to 100° C., and poured while at this temperature into 60 litres of a stannous chloride solution, containing 600 grams of stannous chloride per litre. After heating for one hour to 100° C., 100 litres of concentrated hydrochloric acid of 35% are added, when after cooling the stannous chloride double salts separates; this is filtered off, washed with hydrochloric acid of 30%, and decomposed in the customary manner.

The resulting 6-methoxy-8-amino-quinoline distills at 137–138° C. at a pressure of about 1 mm. of mercury. It forms a viscous, light yellow oil, which solidifies to an almost white crystalline mass having a melting point of 41° C. With hydrochloric acid it forms a beautifully crystalline monohydrochloride, possessing an orange color and which dissolves in cold water with difficulty. Instead of stannous chloride other reducing agents such as zinc or iron can be used, or electrolytic reduction may also be resorted to.

In general the present invention comprises reducing 6-alkoxy-quinoline compounds having in the 8-position a nitrogen-containing group capable of conversion into the amino group by reduction, such as the nitro- or the arylazo-groups, by means of the known reduction procedures.

We claim:

The hereindescribed new 6-methoxy-8-amino-quinoline having most probably the following formula:

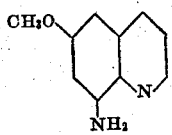

being a whitish crystalline substance melting at about 41° C., forming soluble salts with hydrochloric acid, exhibiting antipyretic properties and exerting a strong specific destroying action on blood parasites.

In testimony whereof, we affix our signatures.

WERNER SCHULEMANN.
FRITZ SCHÖNHÖFER.
FRITZ MIETZSCH.